United States Patent [19]
Tokushige et al.

[11] Patent Number: 6,063,870
[45] Date of Patent: May 16, 2000

[54] RIGID VINYL CHLORIDE RESIN COMPOSITION

[75] Inventors: Yuji Tokushige, Ibaraki-ken; Osamu Sodeyama, Tokyo, both of Japan

[73] Assignee: Shin-Etsu Chemical, Co., Ltd., Tokyo, Japan

[21] Appl. No.: 09/129,343

[22] Filed: Aug. 5, 1998

[30] Foreign Application Priority Data

Aug. 11, 1997 [JP] Japan ................................. 9-228899

[51] Int. Cl.⁷ ........................... C08L 27/06; C08L 25/12; C08L 51/00
[52] U.S. Cl. .................... 525/237; 525/238; 525/239; 525/80; 525/83; 525/84; 525/86
[58] Field of Search ................. 525/80, 83, 84, 525/86, 237, 238, 239

[56] References Cited

U.S. PATENT DOCUMENTS 3,626,033  12/1971  Keskula et al. .......................... 525/80

*Primary Examiner*—Mark L. Warzel
*Attorney, Agent, or Firm*—McAulay Nissen Goldberg Kiel & Hand, LLP

[57] ABSTRACT

The rigid vinyl chloride resin composition comprises 100 parts by weight of a vinyl chloride resin having an average degree of polymerization of 350 to 600, 5 to 30 parts by weight of an impact-resistant improver, and 5 to 20 parts by weight of an acrylonitrile-styrene copolymer having a weight ratio acrylonitrile and styrene of 1/99 to 9/91. This composition has good impact strength and fluidity.

5 Claims, No Drawings

RIGID VINYL CHLORIDE RESIN COMPOSITION

BACKGROUND OF THE INVENTION

1. Field of the Invention

This invention relates to a rigid vinyl chloride resin composition having good impact strength and fluidity or flowability.

2. Description of the Prior Art

Impact-resistant rigid vinyl chloride resin moldings in which impact-resistant improvers such as ABS resins or MBS resins are added to vinyl chloride resins are widely used as pipings, building materials, access floor parts and the like. These rigid vinyl chloride resin moldings are manufactured according to molding techniques such as extrusion molding, injection molding and the like.

Where mixtures for rigid vinyl chloride resin moldings which are obtained by adding MBS resins to vinyl chloride resins having an average degree of polymerization of 700 to 800 are injection molded, the molded articles have been ones which are relatively small in size and include, for example, pipes, joints, access floors and the like.

The recent spread of office automation apparatus has urged studies on molding of housings for office automation apparatus made of rigid vinyl chloride resin mixtures in which impact-resistant improvers such as MBS resins or ABS resins are added to vinyl chloride resins.

However, when using rigid vinyl chloride resin mixtures in which impact-resistant improvers such as MBS resins or ABS resins are added to vinyl chloride resins for the injection molding of housings for office automation apparatus, the housings for the OA apparatus are usually so large in size that there arises the problem that the molten resin cannot be uniformly filled throughout a mold upon molding.

There has been a demand for improving the fluidity of a molten resin upon molding.

In order to improve the fluidity, there are known methods including (1) a method using a vinyl chloride resin having a low average degree of polymerization, and (2) a method wherein an amount of an impact-resistant improver is reduced. Although the fluidity is improved in both methods (1) and (2), they are disadvantageous in that the resultant moldings lower in tensile strength and impact resistance. Accordingly, there is a demand for a method of improving fluidity of a molten resin in the course of molding without a sacrifice of tensile strength and an impact resistance of moldings.

Japanese Laid-open Patent Application No. 3-134045 proposes a rigid vinyl chloride resin composition comprising a vinyl chloride resin and an impact-resistant improver wherein an acrylonitrile-styrene copolymer having a weight ratio of acrylonitrile and styrene of 20/80 to 40/60 is added to the composition. As a result, the molten resin melt obtained therefrom can be improved in fluidity upon molding without impeding tensile strength and impact strength of the resultant moldings.

However, although the fluidity of the molten resin upon molding can be improved, the above demand is not fully satisfied.

SUMMARY OF THE INVENTION

Accordingly, it is an object of the present invention to provide a rigid vinyl chloride resin composition which exhibits improved fluidity upon molding without a sacrifice of impact strength.

In order to attain the above object, we have made intensive studies on such compositions. As a result, it has been found that although acrylonitrile-styrene copolymers which are added to vinyl chloride resin in the prior arts are those which have a content of acrylonitrile of 20 to 40% by weight while taking into account the lowering of miscibility with other types of resins and the lowering of physical properties such as impact strength due to the lowering of the miscibility, by further reducing the content of acrylonitrile in acrylonitrile-styrene copolymers while increasing a content of styrene correspondingly, the fluidity of the resultant rigid vinyl chloride resin composition upon molding can be increased without lowering of miscibility with other resins and also without impeding impact strength of molded articles obtained therefrom. The invention has been accomplished based on this finding.

More particularly, the present invention provides a rigid vinyl chloride resin composition comprising 100 parts by weight of a vinyl chloride resin having an average degree of polymerization of 350 to 600, 5 to 30 parts by weight of an impact-resistant improver, and 5 to 20 parts by weight of an acrylonitrile-styrene copolymer wherein a ratio by weight of acrylonitrile to styrene is such that acrylonitrile/styrene=1/99 to 9/91.

DETAILED DESCRIPTION OF THE INVENTION

In the rigid vinyl chloride resin composition of the invention, the vinyl chloride resin used is one which has an average degree of polymerization of 350 to 600. If the average degree of polymerization is less than 350, the resulting composition becomes poor in thermal stability upon molding, thereby lowering long-run properties in the molding process and the impact strength of the resultant moldings and also adversely influencing the surface properties. On the other hand, when the average degree of polymerization exceeds 600, any satisfactory effect is not expected with respect to the improvement in fluidity of a molten resin in the course of molding. It is preferred to use a vinyl chloride resin which has an average degree of polymerization ranging from 400 to 550.

The vinyl chloride resin used in the invention includes a vinyl chloride homopolymer or copolymers of 50% by weight or over, preferably 80% by weight or over, of vinyl chloride and monomers copolymerizable with vinyl chloride. The monomers copolymerizable with vinyl chloride include, for example, vinyl esters such as vinyl acetate, vinyl propionate and the like, acrylic esters such as methyl acrylate, ethyl acrylate and the like, methacrylic esters such as methyl methacrylate, ethyl methacrylate and the like, olefinic monomers such as ethylene, propylene and the like, and vinylidene chloride.

In the composition of the invention, 5 to 30 parts by weight of an impact-resistant improver is added to 100 parts by weight of the vinyl chloride resin. If the amount of the improver is less than 5 parts by weight, satisfactory impact strength is not obtained in the resulting moldings. On the other hand, when the amount exceeds 30 parts by weight, the fluidity of the molten resin undesirably lowers upon molding. The impact-resistant improver should preferably be added in an amount of 7 to 22 parts by weight.

The impact-resistant improvers used in the practice of the invention include, for example, ABS resins, MBS resins, acrylic rubbers and the like, of which ABS resins and MBS resins are preferred.

The ABS resins are made of butadiene rubber components, such as polybutadiene, styrene-butadiene copolymers and the like, to which acrylonitrile monomers such as acrylonitrile, methacrylonitrile and the like (preferably, acrylonitrile), and styrene monomers such as styrene, α-methylstyrene and the like (preferably, styrene) are graft-polymerized.

The ABS resins used in the present invention are preferably those ABS resins which comprise 1 to 25% by weight of an acrylonitrile monomer, 10 to 55% by weight of a styrene monomer and 40 to 75% by weight of a butadiene rubber component.

The MBS resins are made of butadiene rubber components, such as polybutadiene, styrene-butadiene copolymers and the like, to which methacrylate monomers, such as methyl methacrylate, ethyl methacrylate and the like (preferably methyl methacrylate), and styrene monomers such as styrene, α-methylstyrene and the like (preferably styrene), are graft-polymerized.

The MBS resins used in the present invention are preferably ones which comprise 10 to 30% by weight of a methacrylate monomer, 5 to 30% by weight of a styrene monomer, and 55 to 85% by weight of a butadiene rubber component.

In the composition of the invention, 5 to 20 parts by weight (preferably 7 to 17 parts by weight) of an acrylonitrile-styrene copolymer, in which a ratio by weight between acrylonitrile and styrene is such that acrylonitrile/styrene=1/99 to 9/91 is added to 100 parts by weight of a vinyl chloride resin.

If the content of acrylonitrile in the copolymer is less than 1% by weight miscibility with other type of resin becomes poor, thereby unfavorably causing the physical properties, such as impact strength, of the resultant moldings to lower. On the other hand, when the content of acrylonitrile exceeds 9% by weight, an improvement in fluidity of the molten resin upon molding cannot be satisfactory.

When the amount of the acrylonitrile-styrene copolymer is less than 5 parts by weight, the fluidity of the molten resin upon molding cannot be improved satisfactorily. Over 20 parts by weight, the impact strength undesirably lowers.

If necessary, various additives may be added to the resin composition of the invention, including stabilizers, stabilization aids, lubricants, inorganic fillers, releasing agents, colorants, UV absorbers, antioxidants and the like. The stabilizers are not critical in type provided that they are ordinarily formulated in vinyl chloride resins, and include metallic soap stabilizers such as lead dibasic stearate, barium stearate, calcium stearate, zinc stearate and the like, organotin stabilizers such as dibutyltin laurate, dioctyltin maleate, dibutyltin dilauryl mercaptide and the like, and lead stabilizers such as tribasic lead sulfate, lead silicate, dibasic lead phosphate and the like. These may be used singly or in combination of two or more.

The stabilization aids include epoxy compounds, and the lubricants include, for example, polyethylene wax, fatty acid amides, higher alcohols, esters of fatty acids and polyhydric alcohols and the like. The inorganic fillers include calcium carbonate, titanium oxide, talc and the like, of which precipitated calcium carbonate is preferred.

The vinyl chloride resin composition of the invention obtained in this way is mixed by use of any ordinary means such as a high-speed mixer and converted to power or pellets, followed by molding such as by injection molding to obtain molded articles with desired shapes.

The composition of the invention is effectively employed for injection molding. The composition, which is especially adapted for use in injection molding, is one which has a flow rate of 0.30 ml/second or above, preferably 0.32 to 0.55 ml/second, when subjected to a fluidity test wherein a 1 mm thick sheet roll is tested by use of a Koka flow tester under conditions of a load of 200 kgf and a temperature of 200° C.

The rigid vinyl chloride resin composition of the invention has good impact strength and fluidity.

The invention is more particularly described by way of examples, which should not be construed as limiting the invention. Comparative examples are also shown.

EXAMPLES 1, 2 AND COMPARATIVE
EXAMPLES 1 TO 6

The following components were blended to provide formulations shown in Table 1, and the respective blends were kneaded by means of 6-inch rolls at 180° C. for 5 minutes to obtain sheets having different thicknesses of 3 mm and 1 mm. These sheets were used for the following test, with the results shown in Table 1.
<Components used for the tests>
Polyvinyl chloride resin (abbreviated as PVC in the table)
  TK-50 (Shin-Etsu Chemical Co., Ltd., average degree of polymerization of 500)
Stabilizer
  M-1900 (Adeka-Argus Co., Ltd., Mercaptide, organotin stabilizer)
Lubricant
  H-4 (Hoechst AG., polyethylene wax)
  220MP (The Nippon Synthetic Chemical Industry CO., Ltd., polyethylene wax)
MBS resin
  B-56 (Kanegafuchi Chemical Industry Co., Ltd., with a butadiene content of 68 wt %, a methyl methacrylate content of 15 wt %, and a styrene content of 17 wt %)
ABS resin
  Diapet ABS-3001 (Mitsubishi Rayon Co., Ltd., with a butadiene content of 60 wt %, an acrylonitrile content of 24 wt %, and a styrene content of 16 wt %)
Acrylonitrile-styrene copolymer
  AS-Y (with an acrylonitrile content of 5 wt % and a styrene content of 95 wt % and also with a weight average molecular weight of 48,000)
  FD (Daicel Chemical Industries, Ltd., with an acrylonitrile content of 23 wt % and a styrene content of 77 wt % and also with a weight average molecular weight of 65,000)

Static thermal stability test

The resultant 1 mm thick sheet was cut into a test piece. The test piece was placed in a gear oven at 200° C., under which a time (minutes) before the test piece was carbonized was measured.

Impact strength test

The resultant 1 mm thick sheet was cut into pieces, and three pieces were superposed and pressed under conditions of a temperature of 190° C., a preheating time of 6 minutes, a compression pressure of 160 kg/cm²G and a pressing time of 4 minutes, thereby obtaining a 3 mm thick pressed sheet. The impact strength was measured by use of a 60 kg hammer according to a method described in JIS-K-7110.

Fluidity test

Using the resultant 1 mm thick sheet, a flow rate (ml/second) was measured according a Koka flow tester (CFT-500, made by Shimadzu Corporation) under a load of 200 kg and a temperature of 200° C.

Heat distortion temperature test (HDT)

The resultant 3 mm thick sheet was cut into pieces by means of an electric power saw, followed by milling into a test piece having a dimension of 12.7 mm×120 mm×3 mm. Thereafter, this sheet was allowed to stand over 88 hours based on the method described in JIS-K-7207, followed by measurement of a temperature when the sample was deflected by 0.26 mm under a bending stress of 18.5 kgf/cm² by use of a heat distortion temperature test device (H.D.T & V.S.T tester, made by Toyo Seiki Co., Ltd.).

Injection molding spiral flow test

The respective components having such formulations of Examples 1, 2 and Comparative Examples 1, 2, and 4 to 6 as shown in Table 1 were supplied to a super mixer at ratios by weight to obtain compounds.

The resultant compounds were each subjected to mixing extrusion by use of a 50 mmφ uniaxial extruder and subsequently pelletized by means of a pelletizer to obtain pellets.

Extrusion conditions

Cylinder temperatures: $C_1$=140° C., $C_2$=140° C., $C_3$=150° C., $C_4$=160° C., and D=170° C.

Screw: CR=2.1

Revolutions of screw: 25 r.p.m.

The pellets were fed to an injection molding machine (IS-150E, made by Toshiba Machine Co., Ltd.) and subjected to injection molding by use of a spiral cavity mold under conditions of a barrel temperature of 140 to 180° C., an injection pressure of 90 kg/cm², and a mold temperature of 180° C., under which a distance (cm) of a sample moved along the spiral groove in the mold at the time of the molding was measured.

TABLE 1

| | | | Example | | Comparative Example | | | | | |
|---|---|---|---|---|---|---|---|---|---|---|
| | | | 1 | 2 | 1 | 2 | 3 | 4 | 5 | 6 |
| Components (parts by weight) | PVC | TK-500 | 100 | 100 | 100 | 100 | 100 | 100 | 100 | 100 |
| | MBS resin | B-56 | 15 | | 15 | | | 35 | | 15 |
| | ABS resin | Diapet ABS-3001 | | 20 | | 20 | | | 20 | |
| | AS copolymer | AS-Y | 13 | 15 | | | | 20 | 30 | 30 |
| | | FD | | | 13 | 15 | | | | |
| | Stabilizer | M-1900 | 2.5 | 2.5 | 2.5 | 2.5 | 2.5 | 2.5 | 2.5 | 2.5 |
| | | Ca-St | 1 | 1 | 1 | 1 | 1 | 1 | 1 | 1 |
| | Lubricant | H-4 | 0.5 | 0.5 | 0.5 | 0.5 | 0.5 | 0.5 | 0.5 | 0.5 |
| | | 220MP | 1 | 1 | 1 | 1 | 1 | 1 | 1 | 1 |
| | Filler | Calcium carbonate | 5 | 5 | 5 | 5 | 5 | 5 | 5 | 5 |
| Static Heat Stability (HS) (minutes) | | | 70 | 70 | 70 | 70 | 70 | 70 | 70 | 70 |
| Impact Strength (Izod) (kgf · cm/cm²) | | | 28 | 20 | 32 | 18 | 5 | 60 | 2 | 3 |
| Fluidity (Flowability) (ml/sec) | | | 0.37 | 0.32 | 0.21 | 0.22 | 0.32 | 0.25 | 0.7 | 0.75 |
| Static Heat Distortion Temperature (HDT) (° C./0.26 mm) | | | 67 | 66 | 67 | 66 | 65 | 67 | 67 | 66 |
| Injection Molding Spiral Flow Test (cm) | | | 44 | 42 | 32 | 30 | — | 36 | 75 | 73 |

What is claimed is:

1. A rigid vinyl chloride resin composition comprising 100 parts by weight of a vinyl chloride resin having an average degree of polymerization of 350 to 600, 5 to 30 parts by weight of an impact-resistant improver, and 5 to 20 parts by weight of an acrylonitrile-styrene copolymer, wherein the acrylonitrile-styrene copolymer consists essentially of acrylonitrile and styrene and has a weight ratio of acrylonitrile to styrene of 1/99 to 9/91.

2. The rigid vinyl chloride resin composition according to claim 1, wherein said impact-resistant improver consists of an MBS resin and/or an ABS resin.

3. The rigid vinyl chloride resin composition according to claim 1, wherein when a 1 mm thick rolled sheet is subjected to a fluidity test using a Koka flow tester under conditions of a load of 200 kgf and a temperature of 200° C., a flow rate is 0.30 ml/second or over.

4. The rigid vinyl chloride resin composition according to claim 1, wherein the vinyl chloride resin is a vinyl chloride homopolymer or a copolymer of 50% by weight or more of vinyl chloride and the remaining of a monomer copolynerizable with vinyl chloride.

5. An apparatus comprising the composition according to claim 1, wherein said composition has been injection molded.

* * * * *